INVENTORS
SAVERIO GRANATA
GIAN-CARLO GIACCHETTI

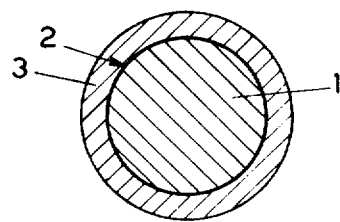
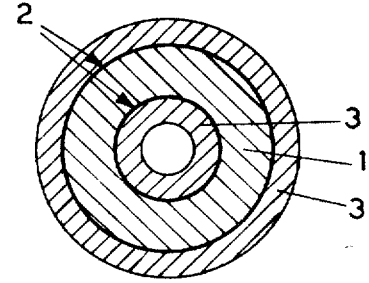
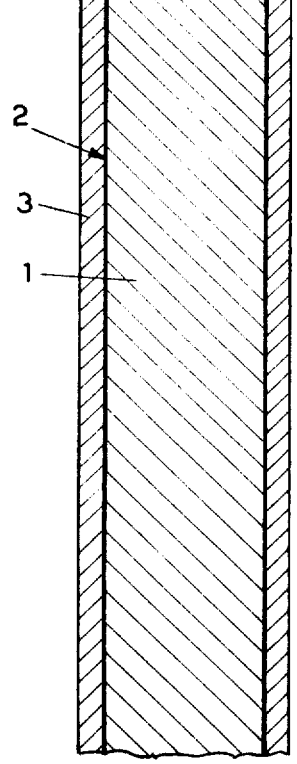
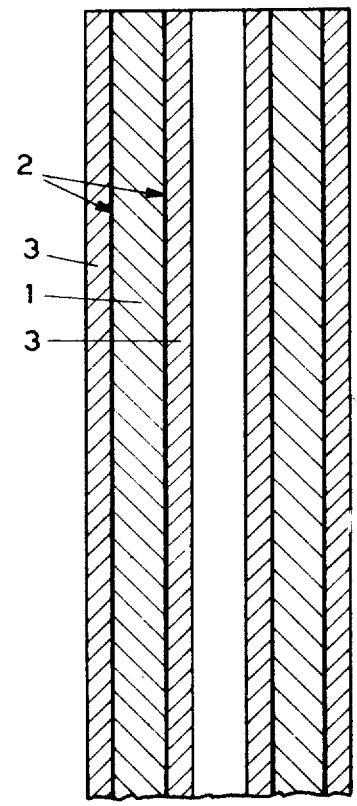

United States Patent Office 3,304,235
Patented Feb. 14, 1967

3,304,235
NUCLEAR FUEL ELEMENTS FORMED BY METALLIC URANIUM OR ITS ALLOYS LINED WITH MAGNESIUM OR ZIRCONIUM ALLOYS AND PROCESS OF LINING SAID ELEMENTS
Saverio Granata and Gian-Carlo Giacchetti, Milan, Italy, assignors to SNAM S.p.A., Milan, Italy, a company of Italy
Filed Dec. 15, 1964, Ser. No. 418,412
Claims priority, application Italy, Dec. 16, 1963,
682,916/63
7 Claims. (Cl. 176—82)

This invention relates to improvements in nuclear fuel elements formed by metallic uranium or its alloys lined with magnesium or zirconium alloys and in the process of protective lining of said elements.

It is known that one of the basic problems concerning the protective lining of nuclear fuels lies in the manufacture of elements wherein a perfect and lifelong adhesion between the fuel and the lining material is ensured.

It is likewise known that, in the particular case of metallic uranium fuel elements lined with magnesium-based alloys, which are conventionally employed in graphite-moderated, $CO_2$-cooled reactors, owing to the significant difference in the physical and mechanical properties of the two materials, it has not been possible, as yet, to achieve perfect adhesion between the fuel and its lining, in the sense that said adhesion is to last the whole lifetime of the fuel element with the reactor.

The line of demarcation of the two materials forming the elements manufactured hitherto, at which there is attendant formation of cavities, is that which most significantly jeopardizes the fuel element.

The element of the present invention, with which it has been possible to achieve a metallurgical merging between metallic uranium and magnesium-based alloys, overcomes all of the above listed drawbacks and is therefore a remarkable technical advance if one considers the longer life such an element possesses over the elements manufactured hitherto with metallic uranium and the improved efficiency of the thermal exchange system as well.

The improvement in terms of heat exchange can be easily explained by the fact that gas barriers exist between the fuel and the lining, said barriers generally causing the thermal conductivity from the fuel element to the cooling medium to be decreased. This, of course, allows the power of nuclear systems may be considerably increased.

An object of the present invention is to manufacture fuel elements wherein the metallic- or alloyed uranium fuel and the magnesium- or zirconium alloy protective lining are mutually bonded by way of a thin layer of titanium which ensures a perfectly unbroken connection between the materials, since interdiffusion phenomena have taken place both between titanium and fuel, and between titanium and lining metal.

More particularly, but not exclusively, these considerations hold good and are of an economical importance for the fuel elements of the Latina-type gas reactors.

The present status of the art is illustrated below:

The U.K. specification 809,671 (U.K.A.E.A.) is concerned with an uranium-based fuel element having a magnesium protective sheath. The bond between uranium and the sheath is assured by an interposed thin layer of a metal or an alloy which is diffused within uranium or within the sheath metal at a temperature in the range 400° C.–800° C. The metals employed for the sheathing are: aluminum, magnesium, beryllium, aluminum-magnesium alloys. The metals employed as intermediate elements are: aluminum, nickel, cobalt, iron.

The solid state solubility of titanium in magnesium is exceedingly poor and the solid state solubility of magnesium in titanium is limited, as disclosed in the article: "Preliminary Investigation of the System Titanium-Magnesium," which appear in the Journal of Metals, 1955, page 368.

Adda and co-workers, in a communication made to the second conference for the non-military uses of atomic energy at Geneva, 1958, reported in the "Proceedings," vol. 6, page 75, point out that the interdiffusion between titanium and uranium does not take place to a significant degree unless a temperature of 650° C. is exceeded, and that the Kirkendall effect, with formation of detrimental cavities, is seldom reported to occur in this case (cfr. Proceedings, vol. 6, page 83).

The practicability of achieving a satisfactory bonding by co-laminating titanium and zircaloy-2, with a thickness reduction as high as 20% at 870° C., is reported in the American report by Bettis (WAPD–BT–10, 10.58) which appeared in "Reactor Core Materials," vol. 2, No. 2 (1959), page 48.

Finally, the American report AEC–BMI–717 (Dec. 20, 1951) refers to a process of application of metal layers on zirconium by lamination and experimental results are supplied on the diffusion of the titanium-zirconium system.

From the above cited literature it can be appreciated that the prior art has not yet satisfactorily solved the problem of bonding between metals such as, e.g., titanium and uranium on the one hand and uranium and magnesium or zirconium, and titanium on the other hand.

At the present status of the art an indirect bonding between uranium and lining by means of an intermediate element such as titanium does not appear to have put into practice, and this is the fundamental subject-matter of the present invention.

According to the present invention the fuel element is obtained by inserting between the metallic uranium or uranium alloy bar and the magnesium alloy which forms the outer casing a thin layer of titanium which is caused to be diffused both towards the fuel and towards the casing. Such a method of manufacture of the fuel elements allows, due to the value of the diffusion coefficients, obtaining diffused layers having a controlled thickness which generally is not less than 4 microns for each side of the diffusion, this thickness being determined by employing an analytical method which permits ascertaining concentrations as low as 0.1% of either elemental metal within the other one.

Moreover, the average working temperature to which the fuel element is subjected does not appreciably modify said thickness.

Another advantage eventually is that the diffusion layers withstand the stresses between the sheath and the fuel during progress of manufacture and actual use. The system of the present invention can be applied also in water-cooled nuclear reactors, by employing a zirconium-based alloy in lieu of the magnesium-based alloy which forms the outer casing of the fuel element.

The present invention, furthermore, provides for the employment, as a fuel, not only a metallic uranium, but also of the alloys thereof.

In order that the present invention may be best illustrated, a few examples and charts relating to the preparation of a fuel element are reported, which by no means are to be construed in a limiting sense.

In the drawings:

FIG. 1 is an axial sectional view showing a fuel element made according to one embodiment of this invention;

FIG. 1a is a transverse section of this element;

FIG. 2 is an axial sectional view showing a fuel element made according to another embodiment of the invention;

FIG. 2a is a transverse sectional view of this latter element;

Figure 7:
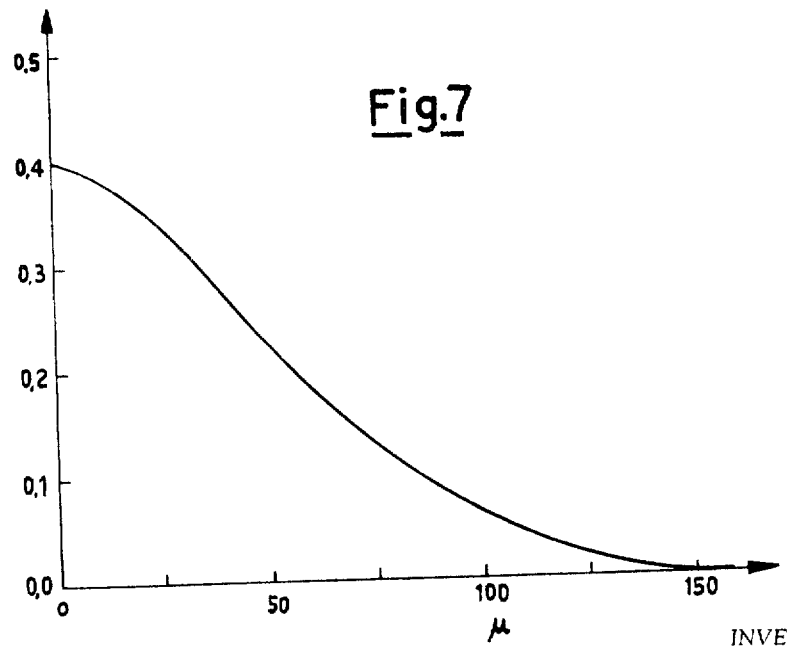
Figure 6A:
Figure 6B:
Figure 6C:
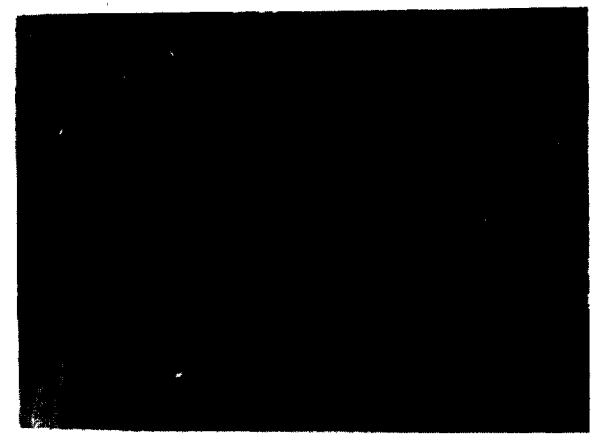

FIGS. 6a, 6b and 6c, respectively, are micrographs illustrating, respectively, a welding seam between titanium and uranium, a welding seam between Magnox Al 80 and uranium where a thin titanium layer is interposed between them, and a welding seam between uranium and zirconium where such a thin titanium layer is interposed; and FIG. 7 is a graph illustrating the diffusion between titanium and Magnox Al 80.

FIG. 1 diagrammatically shows the uranium bar 1 which is lined in its outer portion by the titanium layer 2 and successively by the magnesium or zirconium alloy lining 3. Said element is shown in cross-section on FIG. 1a.

Another embodiment of the fuel element according to the present invention is shown in the diagram of FIG. 2, wherein the element has a tubular shape: the reference numeral 1 is uranium, 2 is titanium and 3 is the magnesium- or zirconium-based alloy casing.

FIG. 2a is a cross-sectional view of the tubular element.

According to the present invention the uranium bar is prepared in the desired size and shape, the bar being allowed at this stage to undergo all the heat treatments which are intended for obtaining the desired structural characteristics.

Figure 3:
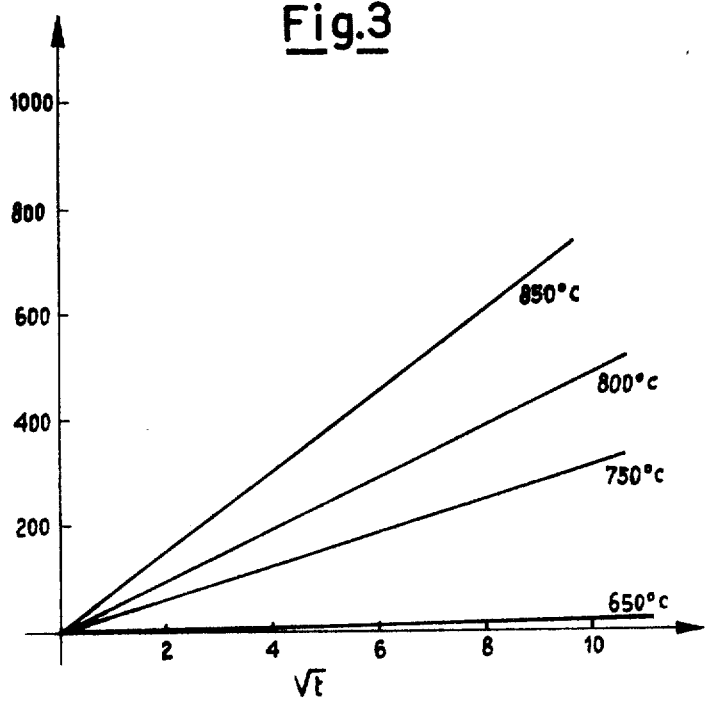
FIG. 3 is a graph referring to the diffusion between non-alloyed uranium and titanium.
Figure 4:
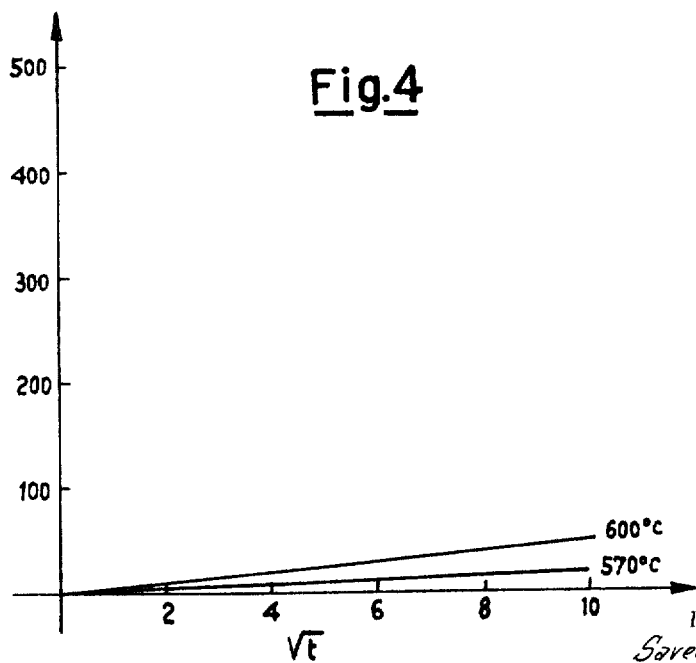
FIG. 4 is a graph showing the diffusion between titanium and a magnesium-based alloy.
Figure 5:
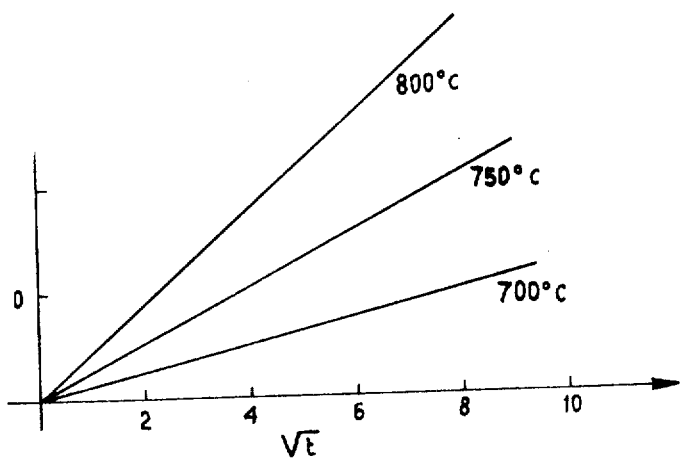
FIG. 5 is a graph relating to the interdiffusion between titanium and zirconium.

The diffusion process between the metals under consideration has the trend shown in the charts of FIGS. 3, 4 and 5.

From the graph of FIG. 3, which refers to the diffusion between non-alloyed uranium and titanium, it is possible to read the diffused thicknesses (in microns) as a function of the square root of the time, for isothermal curves.

The plot of FIG. 4 is likewise concerned with the diffusion between titanium and a magnesium-based alloy (containing 0.7% Al and 0.003% Be).

Finally, the chart of FIG. 5 relates to the interdiffusion between titanium and zirconium.

The diffusion process, which is appreciable at temperatures over 600° C., is, at 550° C., of so slight a degree as not appreciably to modify with the lapse of time the size of the diffused layer.

The bonding then obtained at a temperature above 600° C. stays virtually constant at working temperatures equal to or lower than 550° C. Titanium can be applied by any of the following methods:

(1) *Hot pressing.*—The application of titanium is effected by hot pressing. By this method the uranium bar is lined with a thin titanium casing having such a thickness as not appreciably to alter the neutronic efficiency of the reactor and the assembly is introduced into a hot hydraulic press.

A preliminary bonding is thus achieved, i.e. the surfaces to be interdiffused are brought into close relation and diffusion is primed. The latter can continue, once it has been primed, by merely heating between 550° C. and 800° C.

(2) *Co-extrusion.*—By the co-extrusion process uranium and the thin lining of titanium are simultaneously and concurrently extruded, an intimate contact between the two metals being thus obtained. Thereafter these can undergo the diffusion process at higher temperatures.

(3) *Deposition.*—The titanium layer can be deposited by several methods among which the following can be cited:

(a) Spraying titanium at high temperatures by suitable flame or plasma implementations.

(b) Electroless or electrolitic deposition from titanium salt solutions.

(c) Vaporization under vacuum of titanium over a uranium bar.

Once the suitable titanium layer has been deposited, diffusion at 700° C. is proceeded with, while controlling both time and temperature, so as to obtain the desired thickness for the diffused layer.

At this stage the bar, with the already diffused titanium, can undergo any thermal treatment in order that the desired structure may be obtained, for example by quenching the bar of the "gamma" phase of uranium at room temperature, since the diffused layer tolerates such a treatment without damage. The magnesium alloy lining can be then applied. The assembly of the magnesium alloy and titanium is effected by either of the methods 1 or 2 above.

The interdiffusion between magnesium and titanium takes place at a low temperature, so that it is no longer necessary to heat-treat the bar once more.

While the present invention, for reasons of descriptive clarity, has been based on that which has been reported above and illustrated in the drawings, many modifications and additions can be made thereto in the practical use of the present invention, all of them to be regarded as being encompassed by the basic concepts indicated above and without departing from the spirit and scope thereof.

Further to illustrate the foregoing, a few illustrative and non-limiting examples are reported herein of weldings obtained by diffusion according to the techniques of the above indicated diffusion under pressure and subsequent thermal treatment of controlled diffusion.

The micrograph of FIG. 6a is illustrative of a welding seam between titanium and uranium, of nuclear purity. The several phases which are present in the diffused layer are clearly visible.

The plot of FIG. 7 illustrates the diffusion between titanium and Magnox Al 80 by the penetration-concentration curve obtained with the electronic microprobe, since the trend of diffusion, in this case, cannot be ascertained with metallographic examination. Diffusions took place at temperatures in the order of 600° C. during a time of 500 hours.

The micrograph of FIG. 6b shows a metallurgical welding seam between Magnox Al 80 and metallic uranium (nuclear purity) obtained by inserting a thin titanium layer therebetween.

The micrograph of FIG. 6c is illustrative of a metallurgical welding seam between uranium and zirconium, obtained also by interposing a thin titanium layer.

What is claimed is:

1. A fuel element of uranium or uranium alloys, lined with a lining consisting of magnesium or zirconium-based alloys or of zirconium, wherein a layer of titanium is interposed between the fuel element and the lining which is interdiffused both towards the fuel element and towards the lining.

2. Process of lining of fuel elements of metallic uranium or its alloys by means of a lining consisting of magnesium or zirconium base alloys or of zirconium comprising on the uranium or uranium alloy fuel element first applying a layer of titanium, and interdiffusing the titanium layer with the fuel element, and then applying the lining on the layer of titanium and effecting interdiffusion between the titanium and the lining.

3. Process according to claim 2, wherein the element is a bar, and the layer of titanium is hot-pressed on the bar and then the temperature is raised to between 550° C. and 800° C. without applying any pressure, to achieve an interdiffusion between the titanium layer and the bar the thickness of the titanium layer being not less than four microns.

4. Process according to claim 2, wherein the fuel element is a bar, and the bar and the titanium layer are concurrently co-extruded, to obtain intimate contact between the two metals, and then interdiffusion of the two metals is effected at a higher temperature.

5. Process according to claim 2, wherein the fuel element is a bar, and the titanium layer is deposited over the bar of uranium or its alloys by spraying in hot or plasma condition.

6. Process of lining of fuel elements of metallic uranium or its alloys by means of a lining consisting of magnesium or zirconium based alloys or of zirconium, wherein a layer of titanium is interposed between the fuel element and the lining, the fuel element and the lining with the layer of titanium interposed between them are co-extruded at a temperature such that interdiffusion of the layer both toward the fuel element and toward the lining takes place simultaneously with the co-extrusion.

7. Process of lining of fuel elements of metallic uranium or its alloys by means of a lining consisting of magnesium or zirconium based alloys or of zirconium, according to claim 6, wherein the fuel element and the lining with the layer of titanium interposed between them are co-extruded in hot condition, and after the co-extrusion suitable heat-treatment is effected to obtain interdiffusion of the layer both toward the fuel element and toward the lining.

References Cited by the Examiner
FOREIGN PATENTS 799,771   8/1958   Great Britain.

CARL D. QUARFORTH, *Primary Examiner.*

BENJAMIN R. PADGETT, LEON D. ROSDOL,
*Examiners.*

M. J. SCOLNICK, *Assistant Examiner.*